(12) United States Patent
Meyer et al.

(10) Patent No.: US 9,077,635 B2
(45) Date of Patent: Jul. 7, 2015

(54) METHOD AND APPARATUS FOR NETWORK SUBNET DISCOVERY

(75) Inventors: Lawrence W. Meyer, Fairport, NY (US); Vijay Kumar, Webster, NY (US); Walter Igharas, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 319 days.

(21) Appl. No.: 13/405,962

(22) Filed: Feb. 27, 2012

(65) Prior Publication Data

US 2013/0223441 A1    Aug. 29, 2013

(51) Int. Cl.
*H04L 12/721* (2013.01)
*H04L 12/24* (2006.01)
*H04L 12/751* (2013.01)

(52) U.S. Cl.
CPC ............... *H04L 41/12* (2013.01); *H04L 45/02* (2013.01); *H04L 41/0213* (2013.01)

(58) Field of Classification Search
USPC ............................... 370/389, 395.1, 432, 457
See application file for complete search history.

(56) References Cited

U.S. PATENT DOCUMENTS

| | | | | |
|---|---|---|---|---|
| 6,393,386 B1* | 5/2002 | Zager et al. | ...................... | 703/25 |
| 7,072,337 B1* | 7/2006 | Arutyunov et al. | ........... | 370/389 |
| 7,193,974 B2* | 3/2007 | Eatough et al. | ................ | 370/254 |
| 2001/0052011 A1* | 12/2001 | Nagao | ............................ | 709/224 |
| 2003/0005092 A1* | 1/2003 | Nelson et al. | ................. | 709/220 |
| 2008/0019367 A1* | 1/2008 | Ito et al. | .......................... | 370/392 |

OTHER PUBLICATIONS

Case et al., "Introduction and Applicability Statements for Internet Standard Management Framework"; IETF Network Working Group, RFC 3410, Dec. 2002.*

* cited by examiner

*Primary Examiner* — Joseph Bednash

(57) ABSTRACT

A method and non-transitory computer readable medium for discovering network subnets are disclosed. For example, the method sets a host portion of a network address to a fixed value for a particular network, sends a discovery message to a subnet of a plurality of subnets having the fixed value of the host portion for the particular network, discovers the subnet if a response to the discovery message is received from a device and repeats the sending and the discovering until all of the plurality of subnets are checked, where the sending and the discovering are applied only to the fixed value of the host portion for each of the plurality of subnets.

10 Claims, 3 Drawing Sheets

METHOD AND APPARATUS FOR NETWORK SUBNET DISCOVERY

The present disclosure relates generally to discovery of network subnets and, more particularly, to a method and non-transitory computer readable medium for more efficient discovery of network subnets.

BACKGROUND

Current methods of discovering subnets on a customer's network are inefficient or cumbersome. For example, there are a limited number of options for discovering subnets on the customer's network.

One option is to ask the customer's network administrator for the subnets in the customer's network. However, many times the network administrator may not know which subnets are used, do not have time to provide the information or simply may not want to provide the information for security reasons.

Another option is to use one of the currently existing discovery standards such as service location protocol. However, most of the discovery standards are not consistently enabled so that they can be relied upon.

A final option is to sweep every possible network address. However, the customer's network may have millions of possible network addresses, which could take months to scan if every possible network address is scanned.

SUMMARY

According to aspects illustrated herein, there are provided a method, a non-transitory computer readable medium, and an apparatus for processing an email. One disclosed feature of the embodiments is a method that sets a host portion of a network address to a fixed value for a particular network, sends a discovery message to a subnet of a plurality of subnets having the fixed value of the host portion for the particular network, discovers the subnet if a response to the discovery message is received from a device and repeats the sending and the discovering until all of the plurality of subnets are checked, where the sending and the discovering are applied only to the fixed value of the host portion for each of the plurality of subnets.

Another disclosed feature of the embodiments is a non-transitory computer-readable medium having stored thereon a plurality of instructions, the plurality of instructions including instructions which, when executed by a processor, cause the processor to perform a method that sets a host portion of a network address to a fixed value for a particular network, sends a discovery message to a subnet of a plurality of subnets having the fixed value of the host portion for the particular network, discovers the subnet if a response to the discovery message is received from a device and repeats the sending and the discovering until all of the plurality of subnets are checked, where the sending and the discovering are applied only to the fixed value of the host portion for each of the plurality of subnets.

Another disclosed feature of the embodiments is an apparatus comprising a processor that is configured to set a host portion of a network address to a fixed value for a particular network, to send a discovery message to a subnet of a plurality of subnets having the fixed value of the host portion for the particular network, to discover the subnet if a response to the discovery message is received from a device and to repeat the sending and the discovering until all of the plurality of subnets are checked, where the sending and the discovering are applied only to the fixed value of the host portion for each of the plurality of subnets.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for discovering network subnets. As discussed above, discovering subnets on a customer's network may be a cumbersome task considering the vast number of possible subnet addresses that may exist for the customer's network. Current methods are either inefficient or unreliable.

In one embodiment, the present disclosure provides an efficient method for discovering subnets using a simple heuristic that almost all network routers reside at addresses that are consistent relative to the start and end of a subnet. This heuristic is combined with a messaging protocol that does not require pre-authorization and requires all devices to respond.

Figure 1:
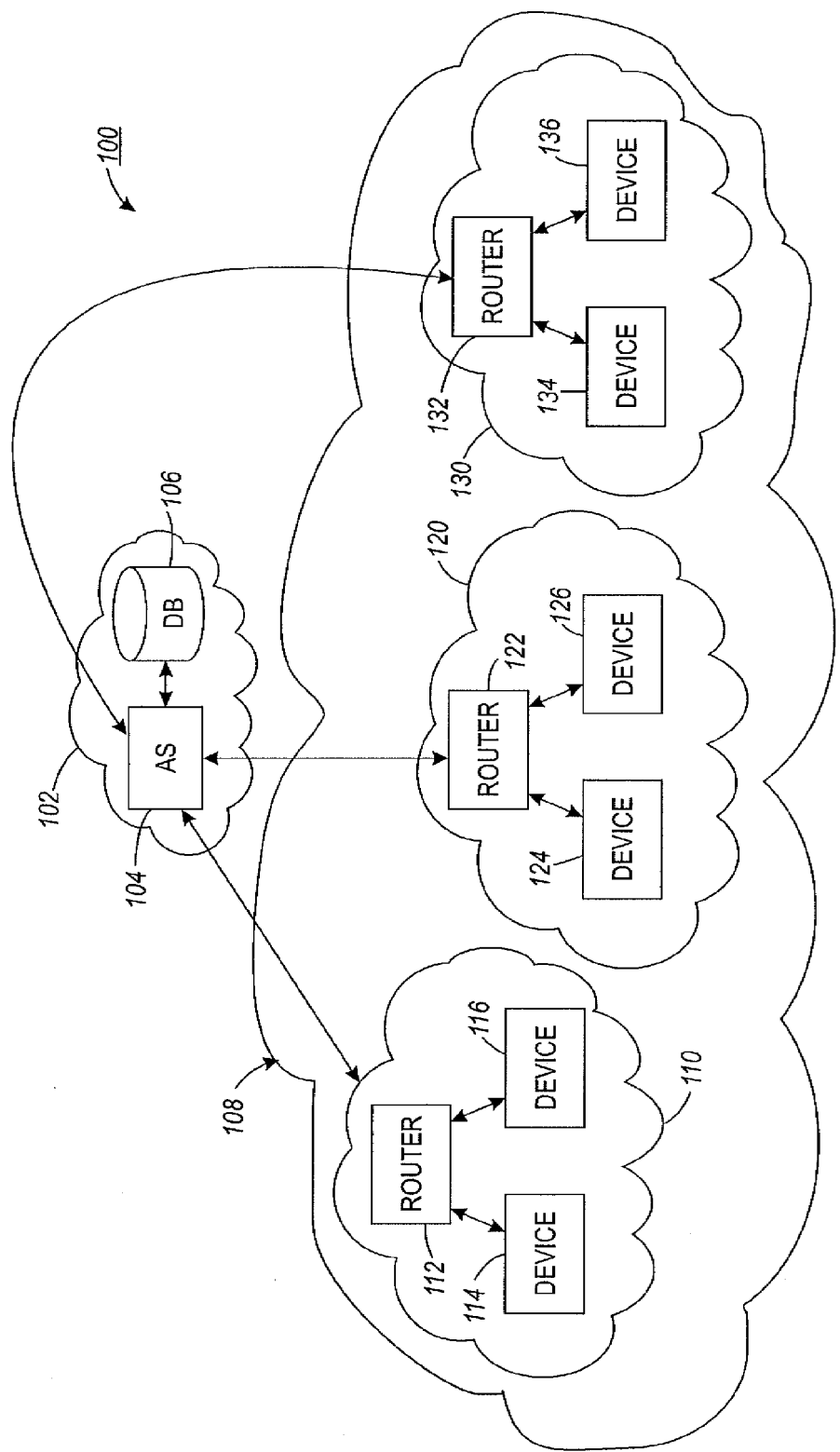
FIG. 1 illustrates one example of a communications network of the present disclosure.

To better understand the present disclosure, FIG. 1 illustrates an example of a communication network 100. In one embodiment, the communication network 100 includes an Internet Protocol (IP) network 102. The IP network 102 may be, for example, the Internet, a service provider network, an access network, a core network and the like.

In one embodiment, the IP network 102 may include an application server (AS) 104 and a database (DB) 106. In one embodiment, the application server 104 may be deployed as a Device Manager. It should be noted that although only a single application server 104 and a single database 106 is illustrated in FIG. 1, that any number of application servers 104 and databases 106 may be deployed.

In one embodiment, the IP network 102 may be in communication with a network 108. In one embodiment, the network 108 may be a private network, for example a private network of a corporation or an enterprise.

In one embodiment, the IP network 102 may be part of the network 108. In other words, the AS 104 and the database 106 may be deployed in the network 108. In another embodiment, the IP network 102 may be located remotely from the network 108. If the IP network 102 is located remotely from the network 108, the communications may be via a virtual private network (VPN) or other similar secure communications protocol that may avoid a firewall at the network 108.

In one embodiment, the network 108 may include a plurality of subnets 110, 120 and 130. Although only three subnets are illustrated in FIG. 1 for ease of description, it should be noted that any number of subnets may be available in the network 108. In fact, the network 108 may include millions of different subnets. The subnet 110 may include a router 112 and one or more endpoint devices 114 and 116. Similarly, the subnets 120 and 130 may include routers 122 and 132, respectively and endpoint devices 124, 126, 134 and 136 respectively.

Although FIG. 1 illustrates one router and two endpoint devices for each subnet, it should be noted that the subnet may include any number of routers and endpoint devices. In one embodiment, the endpoint devices 114, 116, 124, 126, 134 and 136 may be any type of endpoint device including, a printer, a fax machine, a copying machine, a desktop computer, a laptop computer, a tablet device and the like.

In one embodiment, the network 108 may have a plurality of network addresses that include a plurality of subnets. The numbering convention for the network address may include an internet protocol version 4 (IPv4) scheme or an internet protocol version 6 (IPv6) scheme. Network addresses using the IPv4 scheme use 32-bit addresses. The addresses may be represented in a variety of formats including, dot-decimal notation, dotted hexadecimal notation, dotted octal notation, hexadecimal notation, decimal notation and octal notation.

In the dot-decimal notation, the IPv4 network address may be represented as NNN.XXX.XXX.HHH. In one embodiment, the "NNN" portion of the IPv4 network address represents a network identification portion of the network address. For example, a corporation may be assigned a particular value, e.g., "13" for the network portion. As a result, all network addresses within the network 108 for a corporation may have a format of 13.XXX.XXX.HHH.

In one embodiment, the "HHH" portion of the IPv4 network address represents a host portion of the network address. In one embodiment, the "XXX.XXX" portion of the network address may include the subnet of the network address.

In IPv4, each portion of the network address may have one of 255 different values. Thus, for any particular network an IPv4 network address scheme may have over 16 million possible network address combinations. As discussed above, if every possible combination must be checked for subnets, such a process could take months to complete.

Network addresses using the IPv6 scheme use 128-bit addresses. The IPv6 network address may be represented by 8 groups of 16-bit hexadecimal values separated by colons (:). Generally, the IPv6 network address includes two logical parts, a 64-bit network prefix portion and a 64-bit host address portion. Generally, the last hex block of the 64-bit network prefix portion may be considered as the subnet.

For example, the IPv6 address may be generically represented as NNNN:NNNN:NNNN:XXXX:HHHH:HHHH:HHHH:HHHH. The first three hex blocks of "NNNN" may be referred to as the network prefix portion or the network identification portion. The fourth hex block "XXXX" may be referred to as the subnet. The fifth through eighth hex blocks "HHHH" may be referred to as the host portion.

Similar to the IPv4 network address scheme, a corporation may be assigned to a particular value for the network prefix portion, e.g., 2620:0000:0290. Thus, the network 108 may have an IPv6 network address having a format of 2620:0000:0290:XXXX:HHHH:HHHH:HHHH:HHHH.

In IPv6, fixing the network prefix portion still allows $2^{64}$ or over 18 quintillion addresses per subnet. This is even greater than the number of possible addresses under an IPv4 network address scheme. As discussed above, if every possible combination must be checked for subnets, such a process could take months to complete.

Thus, as discussed above, rather than having the application server 104 check every possible network address, the application server 104 may be configured to apply a heuristic and a messaging protocol that does not require pre-authorization and requires a response from a target. For example, generally every subnet has a router that forwards packets to other subnets. These routers generally are advanced enough to have advanced management capability. When a router is installed in a network, network administrators typically follow industry best practices so that every subnet is consistently configured. As noted above, almost all network routers reside at addresses that are consistent relative to the start and end of a subnet.

For example, using an IPv4 address scheme, one can assume that routers will be at host 001 or 254. To illustrate, using the network 108 having a network identification value of 13, the first subnet that is checked may be 13.0.0.1 (it should be noted that under IPv4 convention, the leading zeros may be omitted). If the network address 13.0.0.1 is discovered as a subnet, then all subsequent subnets need only be checked on the first host, i.e., host 001. Alternatively, if the network address 13.0.1.254 is discovered as a subnet, then all subsequent subnets need only be checked on the last host, i.e., host 254.

In addition, the initial host that is checked may be used as seed information for subsequent checks. For example, if the local subnet is configured such that the router is at a different address in the local subnet, this can be used as a seed to indicate that all routers will be consistently at the same relative address in the subnet. A local subnet mask may indicate a typically consistent size of each subnet. To illustrate, if the local mask is 255.255.255.128, the heuristic would know to check both 13.121.238.1 and 13.121.238.128. In another example, if the local mask is 255.255.252.0, where the subnet size is 1024, the heuristic would know to check both 13.121.236.1 and 13.121.240.1.

As a result, for IPv4, the network identification portion and the host portion of the network address remain fixed and only the subnets for a particular host in a particular network need to be checked. As a result, for IPv4, this reduces the network addresses that are scanned down to 255×255, or approximately 65,000 network addresses, from over 16 million. This is over a 99% reduction in the number of network addresses that need to be scanned. Similarly, for IPv6, the number of network addresses that need to be scanned are reduced to $2^{16}$, or approximately 65,000 network addresses, from over 18 quintillion addresses. This is also over a 99% reduction in the number of addresses that need to be scanned.

In addition to the heuristic above, a message protocol that does not require pre-authorization or pre-authentication to send a message and requires a response from a target may be used as a discovery message. In one embodiment, the message protocol may comprise simple network management protocol version three (SNMPv3).

Many network devices, such as routers, are configured with advanced management capabilities such as SNMPv3. SNMPv3 does not require any pre-authorization or pre-authentication to send a message, such as an engine identification request. In addition, the engine identification request message, under SNMPv3, requires a target to respond. Receiving a response to the discovery message provides enough information that a live device is available on a subnet, and thereby, the subnet is discovered. Although SNMPv3 is provided as one example of a message protocol that can be used, it should be noted that any message protocol may be used that does not require pre-authorization or pre-authentication and requires a response from a target.

Using the heuristic and message protocol described above, all of the subnets can be scanned or checked for the network 108. As each subnet is discovered automatically by the application server 104 by receiving a response to a discovery message, the subnet may be recorded in the database 106. The process may be repeated until all of the subnets are checked and all of the discovered subnets may be recorded in the database 106.

Once the valid subnet is discovered via the discovery messages, the subnet information may be used for further network management such as discovering other endpoint devices (e.g., printers, servers, workstations, etc) in the subnet. For example, discovering the subnet 110 may be discovered by sending a discovery message to the router 112. Once the subnet 110 is discovered, this information may be used to discover and manage other endpoints in the subnet 110, e.g., devices 114 and 116.

As a result, the number of subnets that need to be scanned is greatly reduced. This, in turn, reduces the time needed to scan a network subnets, reduces network traffic, and reduces resources (e.g., processor usage, memory usage, or use of personnel). As a result of the reduced network traffic and reduced use of resources, the stability of the network may also be improved. Thus, the methods provided in the present disclosure provide greater efficiency and many advantages over currently deployed methods for discovering a network's subnets.

It should be noted that the network 100 has been simplified. For example, the network 100 may include other network elements such as border elements, routers, switches, policy servers, security devices, a content distribution network (CDN) and the like. In addition, the network 100 may include additional networks between the IP network 102 and the network 108, such as different access networks.

Figure 2:
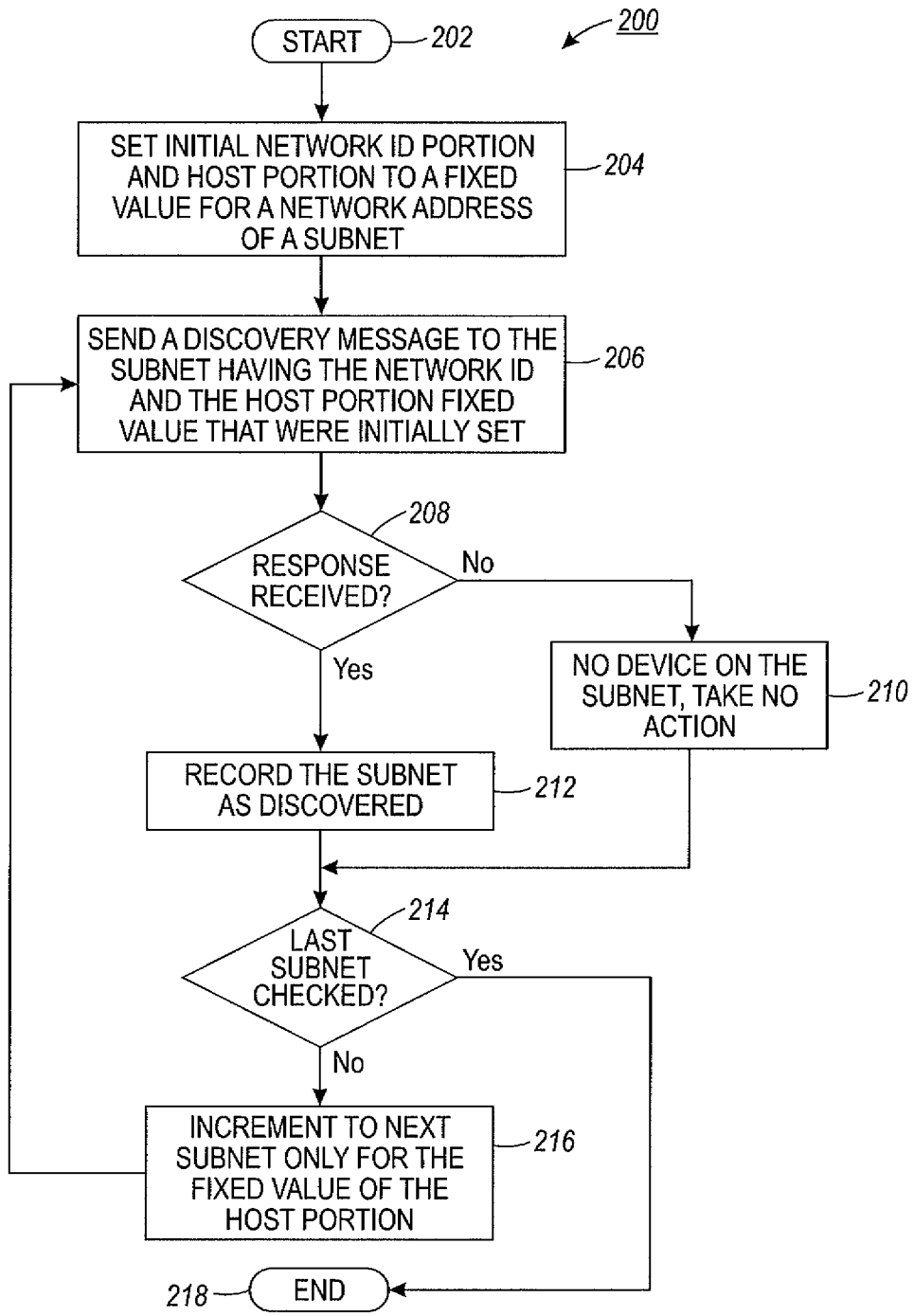
FIG. 2 illustrates an example flowchart of one embodiment of a method for discovering network subnets.
Figure 3:
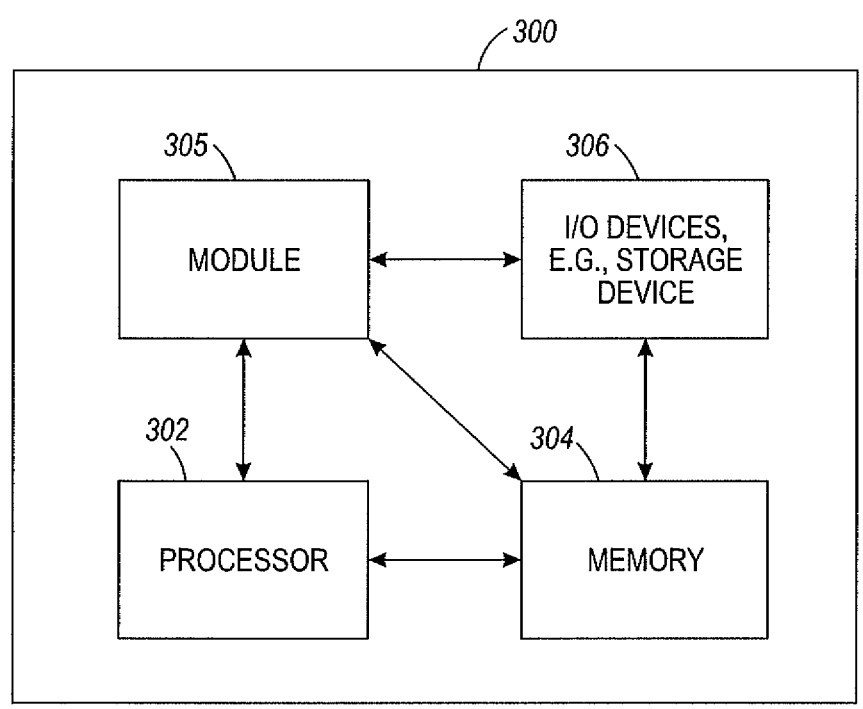
FIG. 3 illustrates a high-level block diagram of a general-purpose computer suitable for use in performing the functions described herein.

FIG. 2 illustrates a flowchart of a method 200 for discovering network subnets. In one embodiment, the method 200 may be performed by the application server 104 or a general purpose computer as illustrated in FIG. 3 and discussed below.

The method 200 begins at step 202. At step 204, the method 200 sets an initial network identification (ID) portion and a host portion for a network address of a subnet. For example, as discussed above, a private network may be assigned a fixed value for the network ID portion. Additionally, the host portion of the network address is set to a fixed value, e.g., representing a first host, a last host, or any other host address value relative to the first or last host for a particular network.

In one embodiment, the heuristic deployed by the present disclosure assumes that certain network devices, e.g., routers, may reside at addresses that are consistent relative to the start and end of a subnet. In other words, it is assumed that certain network devices will consistently reside at the first host or the last host of a particular subnet.

To illustrate by example, using an IPv4 network address scheme, subnet 001 of a network may be assigned a network ID value of 13 and the host portion may be set as the first host, e.g., 0.001. Thus, the method 200 may start scanning all subnets beginning with subnet 13.0.0.1. Alternatively, the host portion may be set as the last host, e.g., 254. Thus, the method 200 may scan all subnets beginning with the subnet 13.0.0.254.

At step 206, the method 200 sends a discovery message to the subnet having the network ID portion and the host portion that were initially set. Using the above example, if the host portion was initialized with the first host, then a discovery message may be sent to subnet 13.0.0.1.

In one embodiment, the discovery message may be sent using a message protocol that does not require pre-authorization or pre-authentication to send a message and requires a response from a target may be used as a discovery message. In one embodiment, the message protocol may comprise simple network management protocol version three (SNMPv3).

Many network devices, such as routers, are configured with advanced management capabilities such as SNMPv3. SNMPv3 does not require any pre-authorization or pre-authentication to send a message, such as an engine identification request. In addition, the engine identification request message, under SNMPv3, requires a target to respond. Receiving a response to the discovery message provides enough information that a live device is available on a particular subnet, and thereby, discovering the particular subnet. This information may then be used to discover and manage other devices in the subnet, such as printers, workstations, and the like.

At step 208, the method 200 determines if a response was received. If a response was not received, the method 200 proceeds to step 210. At step 210, the method 200 determines that there is no device on the subnet and takes no further action and proceeds to step 214.

Referring back to step 208, if the method 200 determines that a response was received, the method 200 proceeds to step 212. At step 212, the method 200 records the subnet as discovered. For example, if a response was received to the discovery message sent to subnet 13.0.0.1, then the method 200 would determine that the subnet 13.0.0.1 is a valid subnet and record the subnet 13.0.0.1 as being discovered in the database.

At step 214, the method 200 determines whether the last subnet was checked. If the last subnet was not checked, the method 200 proceeds to step 216.

At step 216, the method 200 increments to the next subnet. For example using an IPv4 network address scheme, if the subnet 13.0.0.1 was just scanned, the method 200 could increment to the subnet 13.0.1.1. In other words, the actual value of the next subnet may be dependent on the network address scheme that is used by the network. The method 200 would then go back to step 206, where a discovery message is sent to the subnet having the network ID portion and the host portion that were initially set, e.g., 13.0.1.1. In other words, the network ID portion and the host portion remain fixed throughout the entire process. Only the subnet of the network address is changed, thereby greatly reducing the number of network addresses that need to be scanned for subnet discovery. In other words, the discovery method as discussed is applied repeatedly only to the fixed value of the host portion for each of the plurality of subnets for a particular network ID. It should be noted that a different fixed address can be used for a different network ID. The method then repeats steps 206, 208, 210, 212, 214 and 216 until all subnets are checked.

Referring back to step 214, if at step 214 the last subnet is checked, then the method 200 proceeds to step 218. The method 200 ends at step 218.

It should be noted that although not explicitly specified, one or more steps of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for discovering network subnets, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 305 for discovering network subnets can be loaded into memory 304 and executed by processor 302 to implement the functions as discussed above. As such, the present method 305 for discovering network subnets (including associated data structures) of the present disclosure can be stored on a non-transitory (e.g., tangible or physical) computer readable storage medium, e.g., RAM memory, magnetic or optical drive or diskette and the like. For example, the processor 302 can be programmed or configured with instructions (e.g., computer readable instructions) to perform the steps of method 200.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for discovering network subnets, comprising:
   beginning the discovering with a value of 001 or 254 for a host portion of a network address to a fixed value for a particular network, wherein the particular network comprises a private network of a customer;
   sending a discovery message to a subnet of a plurality of subnets having the value of the host portion for the particular network, wherein the discovery message comprises a simple network management protocol (SNMP) version 3 that requires no pre-authorization and requires a response from a device, wherein which ones of the plurality of subnets are being used is previously unknown for all of the plurality of subnets;
   discovering the subnet when the response to the discovery message is received from the device;
   fixing the value of the host portion in response to the discovering the subnet;
   using the value as a seed for subsequent checks to indicate that all routers will be at a same address in a local subnet when the local subnet is configured such that a router is at a different address in the local subnet;
   recording the subnet that is discovered in a database after the discovering;
   discovering one or more endpoints on the subnet; and
   repeating the sending, the discovering the subnet, the recording and the discovering the one or more endpoints on the subnet until all of the plurality of subnets are checked, where the sending, the discovering the subnet, the recording and the discovering the one or more endpoints on the subnet are applied only to the value of the host portion that is fixed for each of the plurality of subnets.

2. The method of claim 1, wherein the discovery message comprises an engine identification request under SNMPv3.

3. The method of claim 1, wherein the network address comprises an Internet protocol version four network address.

4. The method of claim 1, wherein the network address comprises an internet protocol version six network address.

5. A non-transitory computer-readable medium storing a plurality of instructions which, when executed by a processor, cause the processor to perform operations for discovering network subnets, the operations comprising:
   beginning the discovering with a value of 001 or 254 for a host portion of a network address to a fixed value for a particular network, wherein the particular network comprises a private network of a customer;
   sending a discovery message to a subnet of a plurality of subnets having the value of the host portion for the particular network, wherein the discovery message comprises a simple network management protocol (SNMP) version 3 that requires no pre-authorization and requires a response from a device, wherein which ones of the plurality of subnets are being used is previously unknown for all of the plurality of subnets;
   discovering the subnet when the response to the discovery message is received from the device;
   fixing the value of the host portion in response to the discovering the subnet;
   using the value as a seed for subsequent checks to indicate that all routers will be at a same address in a local subnet when the local subnet is configured such that a router is at a different address in the local subnet;
   recording the subnet that is discovered in a database after the discovering;
   discovering one or more endpoints on the subnet; and
   repeating the sending, the discovering the subnet, the recording and the discovering the one or more endpoints on the subnet until all of the plurality of subnets are checked, where the sending, the discovering the subnet, the recording and the discovering the one or more endpoints on the subnet are applied only to the value of the host portion that is fixed for each of the plurality of subnets.

6. The non-transitory computer-readable medium of claim 5, wherein the discovery message comprises an engine identification request under SNMPv3.

7. The non-transitory computer-readable medium of claim 5, wherein the network address comprises an internet protocol version four network address.

8. The non-transitory computer-readable medium of claim 5, wherein the network address comprises an Internet protocol version six network address.

9. A method for discovering network subnets, comprising:
   beginning the discovering with a value of 001 or 254 for a host portion of a network address to a fixed value for a particular network, wherein the value of 001 comprises a first host of the network address for the particular network and the value of 254 comprises the last host of the network address for the particular network;
   sending a simple network management protocol version three (SNMPv3) engine identification request message that requires no pre-authorization and requires a response from a router to a subnet of a plurality of subnets having the value of the host portion for the particular network, wherein which ones of the plurality of subnets are being used is previously unknown for all of the plurality of subnets;
   discovering the subnet when the response is received to the SNMPv3 engine identification request message from the router on the subnet, wherein the router is configured with SNMPv3;

fixing the value of the host portion in response to the discovering the subnet;

using the value as a seed for subsequent checks to indicate that all routers will be at a same address in a local subnet when the local subnet is configured such that a router is at a different address in the local subnet;

recording the subnet as discovered in a database after the response from the router is received;

discovering one or more endpoints on the subnet;

repeating the sending, the discovering the subnet, recording and the discovering the one or more endpoints on the subnet until all of the plurality of subnets are checked, where the sending, the discovering the subnet, the recording and the discovering the one or more endpoints on the subnet are applied only to the fixed value of the host portion for each of the plurality of subnets.

10. The method of claim 9, wherein the network address comprises at least one of: an internet protocol version four address or an internet protocol version six address.

\* \* \* \* \*